United States Patent
Lowery, Jr. et al.

(10) Patent No.: US 10,336,370 B1
(45) Date of Patent: Jul. 2, 2019

(54) AUTONOMOUS ALL-TERRAIN VEHICLE FRAME STRUCTURE

(71) Applicant: Honda Motor Co., Ltd., Tokyo (JP)

(72) Inventors: Richard M. Lowery, Jr., London, OH (US); Justin M. Winter, Mount Victory, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/845,613

(22) Filed: Dec. 18, 2017

(51) Int. Cl.
| | | |
|---|---|---|
| *B62D 21/02* | (2006.01) | |
| *B60K 1/04* | (2019.01) | |
| *B60L 11/18* | (2006.01) | |
| *B62D 25/08* | (2006.01) | |
| *G05D 1/02* | (2006.01) | |

(52) U.S. Cl.
CPC ............... *B62D 21/02* (2013.01); *B60K 1/04* (2013.01); *B60L 11/18* (2013.01); *B60L 11/1809* (2013.01); *B62D 25/08* (2013.01); *B60K 2001/0405* (2013.01); *G05D 1/021* (2013.01)

(58) Field of Classification Search
CPC .......................... B62D 21/02; B60L 11/1809
See application file for complete search history.

(56) References Cited

U.S. PATENT DOCUMENTS

| | | | |
|---|---|---|---|
| 5,975,624 A * | 11/1999 | Rasidescu | B62D 21/183 180/311 |
| 7,513,516 B2 | 4/2009 | Ryan | |
| 8,276,699 B2 * | 10/2012 | Elhardt | B60K 11/08 180/68.6 |
| 8,646,832 B2 | 2/2014 | Yamashita | |
| 8,763,735 B2 | 7/2014 | Watanabe | |
| 8,950,533 B2 | 2/2015 | Nemesh et al. | |

(Continued)

FOREIGN PATENT DOCUMENTS

| | | |
|---|---|---|
| CN | 206327495 U | 7/2017 |
| DE | 102010008343 A1 | 8/2011 |

(Continued)

OTHER PUBLICATIONS

"Cargo Unmanned Ground Vehicles" http://www.w54.biz/showthread.php?391-Unmanned-Ground-Vehicles/page7 (Accessed Aug. 4, 2017).

(Continued)

*Primary Examiner* — Brian L Swenson
(74) *Attorney, Agent, or Firm* — Honda Patents & Technologies North America, LLC; Mark L. Duell

(57) ABSTRACT

A frame structure for an all-terrain vehicle includes upper main frame members and lower main frame members extending in a longitudinal direction of the frame structure. The lower main frame members have forward and rearward portions mounted to the upper main frame members and central portions extended in a lateral direction of the frame structure outward of the upper main frame members. A component mounting bracket is mounted to a forward end portion of the upper main frame members, upper forward suspension sub-frame members, and second sub-frame members disposed bridgingly between the upper main frame members and the upper forward suspension sub-frame members. A battery pack charger is mounted to the component mounting bracket in a space between component mounting bracket and a grille.

17 Claims, 9 Drawing Sheets

(56) References Cited

U.S. PATENT DOCUMENTS

| | | | |
|---|---|---|---|
| 8,955,632 B2* | 2/2015 | Schurna | B62D 23/005 |
| | | | 180/210 |
| 9,000,724 B2 | 4/2015 | Minami | |
| 9,079,504 B2 | 7/2015 | Amano et al. | |
| 9,868,343 B2* | 1/2018 | Uranaka | B62D 21/11 |
| 10,065,500 B2* | 9/2018 | Higuchi | B62D 21/02 |
| 2004/0100225 A1 | 5/2004 | Neil et al. | |
| 2009/0014993 A1* | 1/2009 | Tope | B60R 3/002 |
| | | | 280/781 |
| 2016/0361990 A1 | 12/2016 | Porras et al. | |
| 2017/0088005 A1 | 3/2017 | Christen et al. | |
| 2018/0186410 A1* | 7/2018 | Tsumiyama | B62D 25/16 |
| 2018/0304765 A1* | 10/2018 | Newman | B60L 11/1874 |

FOREIGN PATENT DOCUMENTS

| | | | |
|---|---|---|---|
| JP | 2007153053 A | 6/2007 | |
| JP | 2013230731 A | 11/2013 | |
| JP | 2014091448 A | 5/2014 | |
| KR | 20100137960 A | 12/2010 | |

OTHER PUBLICATIONS

"DIYGoKart" https://www.pinterest.ie/pin/384987468120550320 (Accessed Aug. 4, 2017).
"Mega UGV" http://www.megaev.com/mega-ugv/ (Accessed Aug. 4, 2017).
"Multifunction Utility" https://www.militaryfactory.com/imageviewer/ar/gallery-ar.asp?armor_id=314 (Accessed Aug. 4, 2017).
"MUTT UGV" http://hamshenci.livejournal.com/28932.html (Accessed Aug. 4, 2017).
"The Unmanned Ground Vehicle" https://www.pinterest.se/pin/737534876446712384/ (Accessed Aug. 4, 2017).

* cited by examiner

AUTONOMOUS ALL-TERRAIN VEHICLE FRAME STRUCTURE

BACKGROUND

There are increasing applications for autonomous vehicles, especially autonomous all-terrain vehicles that are adapted and configured to traverse unprepared terrain. The present disclosure relates to a frame structure for an autonomous all-terrain vehicle.

SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a frame structure for an autonomous all-terrain vehicle includes left and right laterally spaced upper main frame members extending in a longitudinal direction of the frame structure, each of the left and right upper main frame members being horizontally disposed and having an upper mounting surface, a front grille located longitudinally forward of the left and right laterally spaced upper main frame members, and a component attached to at least one of the left and right laterally spaced upper main frame members and disposed in a space between the left and right laterally spaced upper main frame members and the front grille.

According to another aspect, a frame structure for an autonomous all-terrain vehicle includes left and right laterally spaced upper main frame members extended in a longitudinal direction of the frame structure, each of the left and right upper main frame members is horizontally disposed and has an upper mounting surface, left and right laterally spaced lower main frame members extended in the longitudinal direction, each of the left and right lower main frame members having a forward portion and a rearward portion each inclined upwards and mounted to the respective left and right upper main frame members and a central portion extended in a lateral direction of the frame structure outward of the respective left and right upper main frame members, left and right first sub-frame members disposed bridgingly between and mounted to the forward and rearward portions of the respective left and right lower main frame members, the left and right first sub-frame members are laterally aligned with the respective left and right upper main frame members in a top view of the frame structure, and wherein the left and right first sub-frame members separate a component space defined by the frame structure into an upper component space and a lower component space, a component mounting bracket mounted to a forward end portion of each left and right upper main frame member, left and right upper forward suspension sub-frame members mounted to the forward inclined portions of the respective left and right lower main frame members, the component mounting bracket mounted to the left and right upper forward suspension sub-frame members, left and right second sub-frame members disposed bridgingly between and mounted to the forward end portions of the respective left and right upper main frame members and the respective left and right upper forward suspension sub-frame members, the component mounting bracket being forward of the left and right second sub-frame members, and a component mounted to the component mounting bracket.

According to yet another aspect, an autonomous all-terrain vehicle includes a frame structure, an electric motor attached to the frame structure, a battery pack for providing electrical power to the electric motor attached to the frame structure, a charger for charging the battery pack, the charger including a housing surrounding the charger, the housing being mounted to the frame structure, and a front grille located longitudinally forward of the frame structure, and wherein the charger is disposed in a space between the frame structure and the front grille.

DETAILED DESCRIPTION

Figure 2:
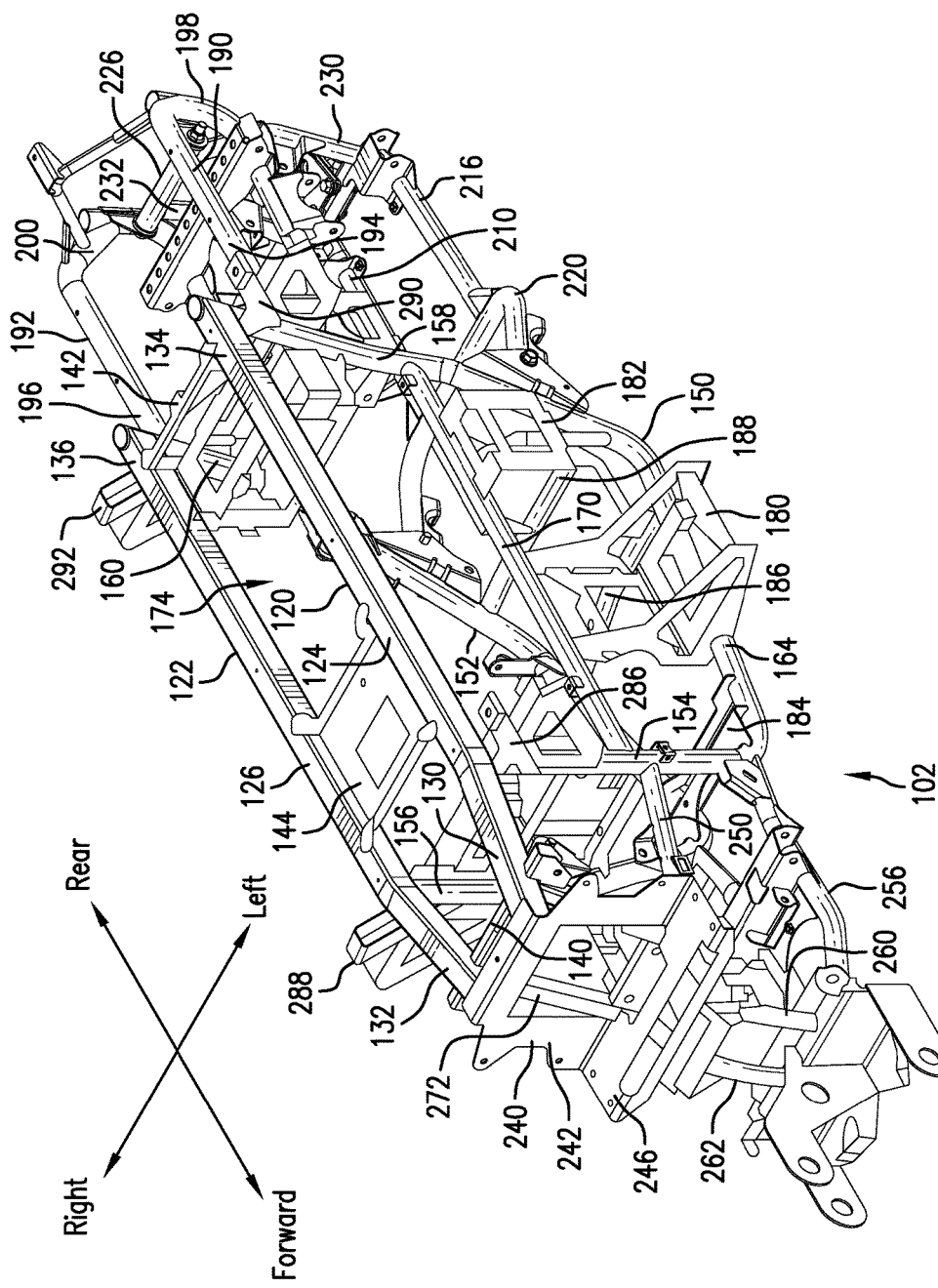
FIGS. 2 and 3 are perspective views of an exemplary frame structure for the autonomous all-terrain vehicle of FIG. 1.
Figure 3:
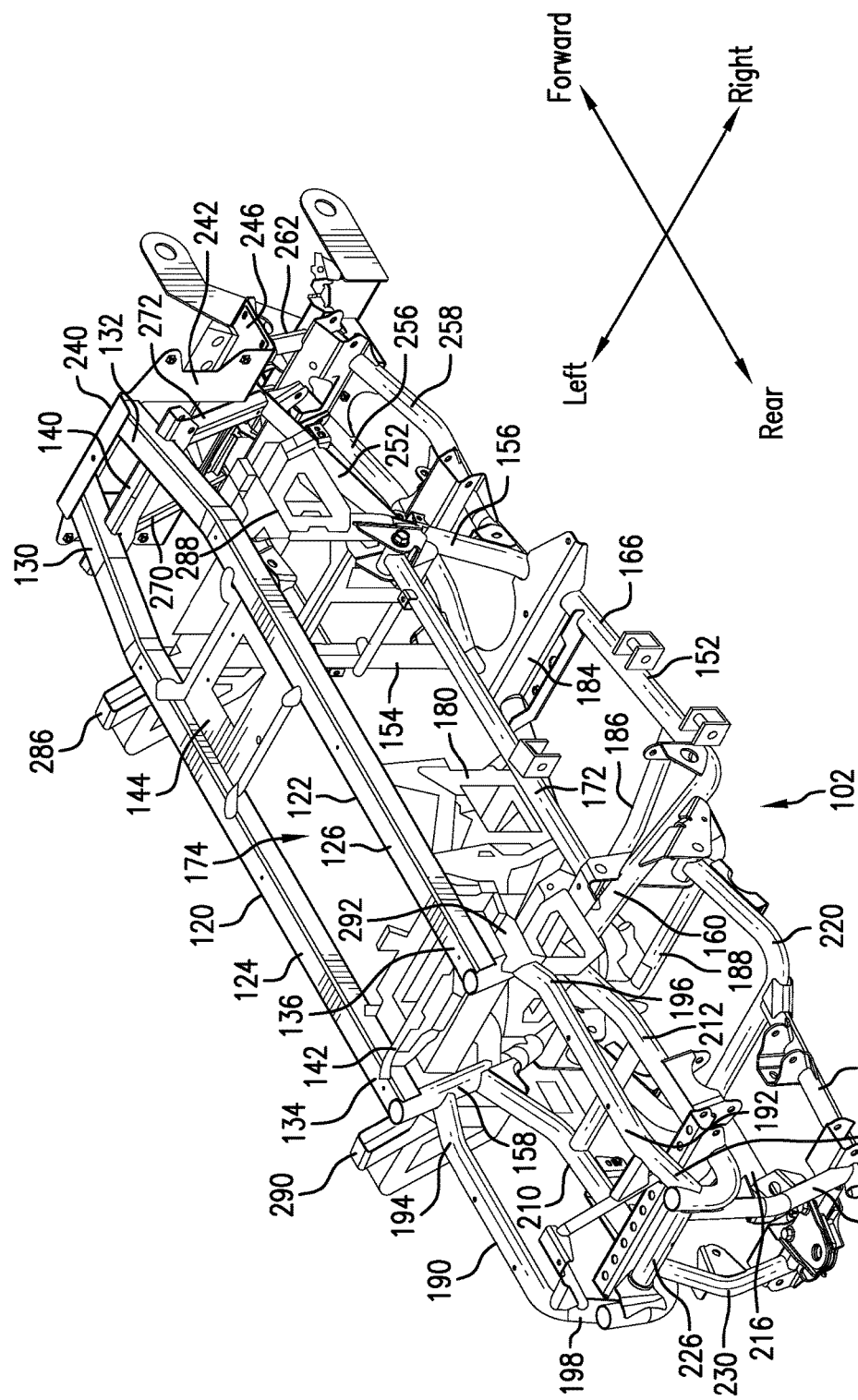
Figure 4:
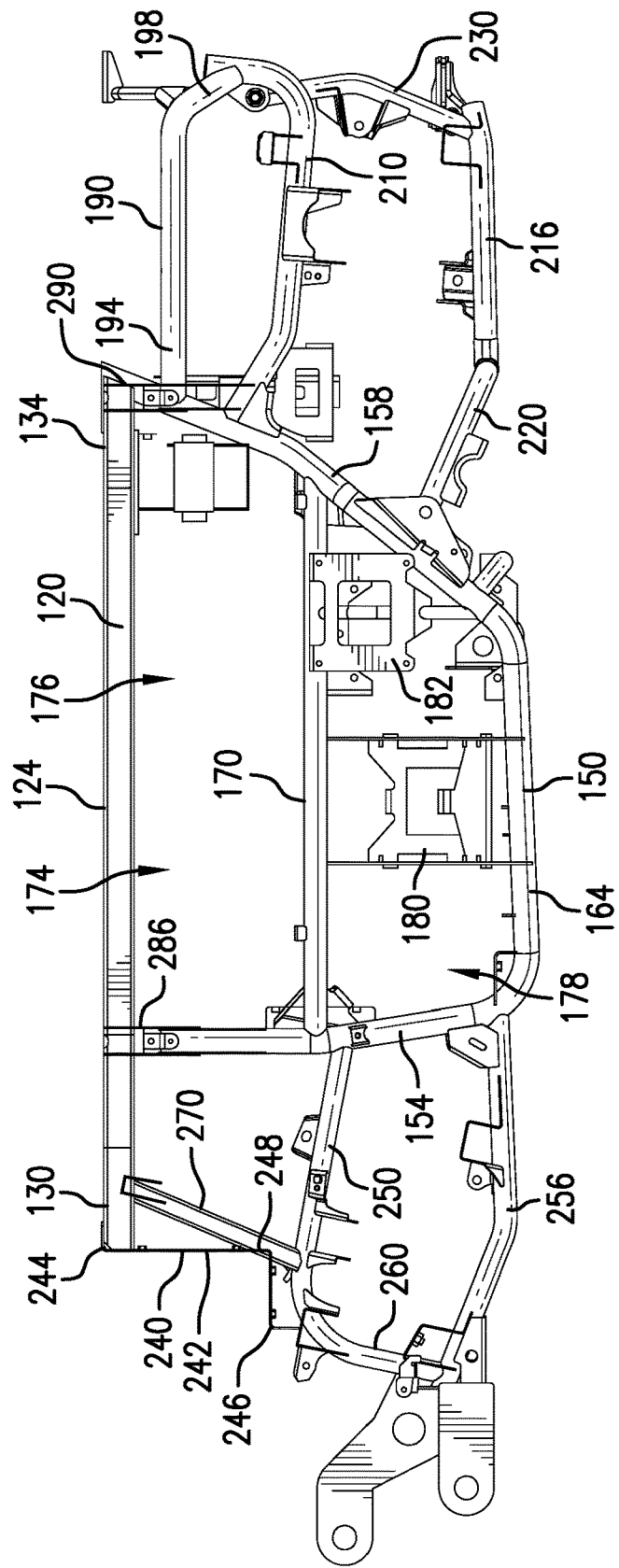
FIG. 4 is a side view of the frame structure of FIG. 2.
Figure 5:
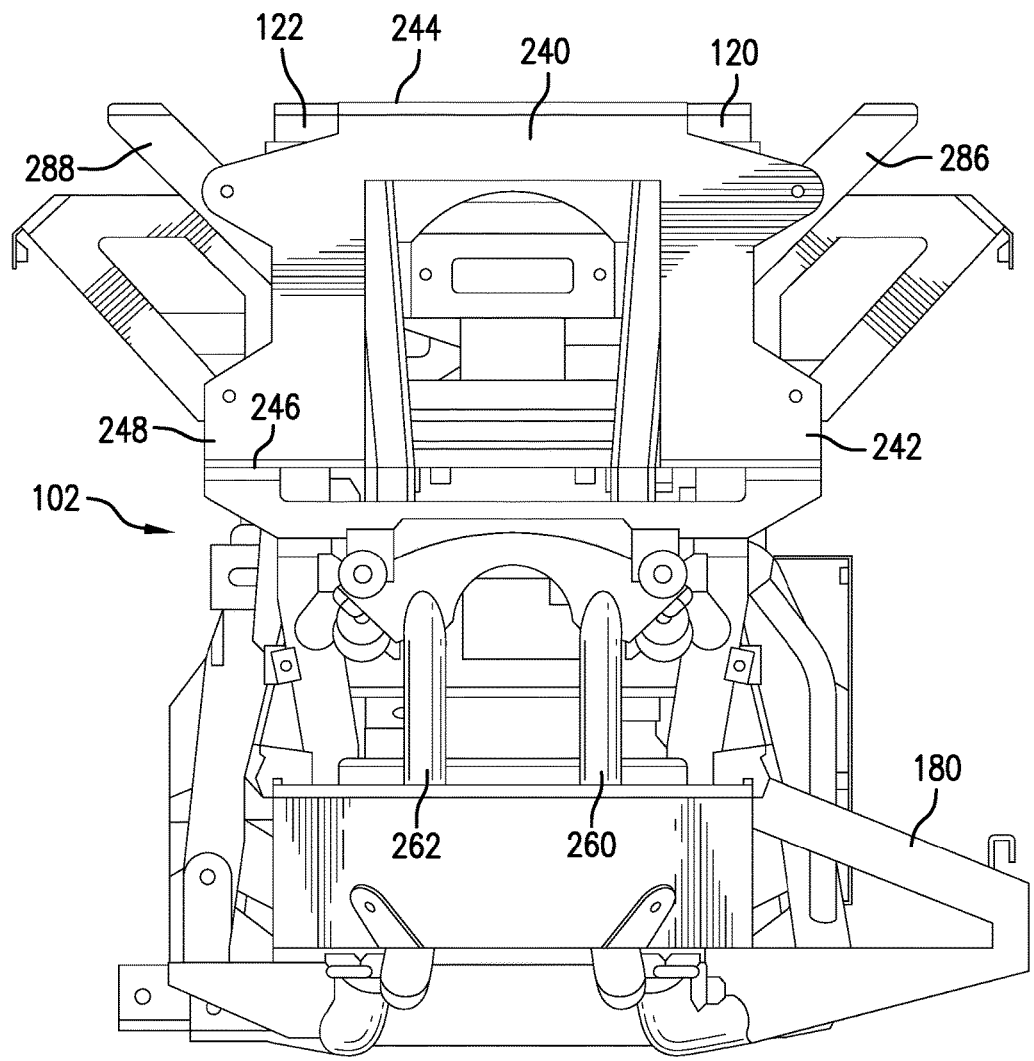
FIG. 5 is a front view of the frame structure of FIG. 2.

It should, of course, be understood that the description and drawings herein are merely illustrative and that various modifications and changes can be made in the structures disclosed without departing from the present disclosure. As used herein, longitudinal directions refer to forward and rearward directions of vehicle travel, transverse/lateral directions are across a width of the vehicle, i.e., left and right directions, and vertical directions relate to elevation, i.e., upward and downward directions. Further, for purposes of description herein, the terms forward, rearward, rear, right, left, vertical, horizontal, and derivatives thereof shall relate to the frame structure of the vehicle as oriented in FIGS. 2 and 3.

Figure 1:
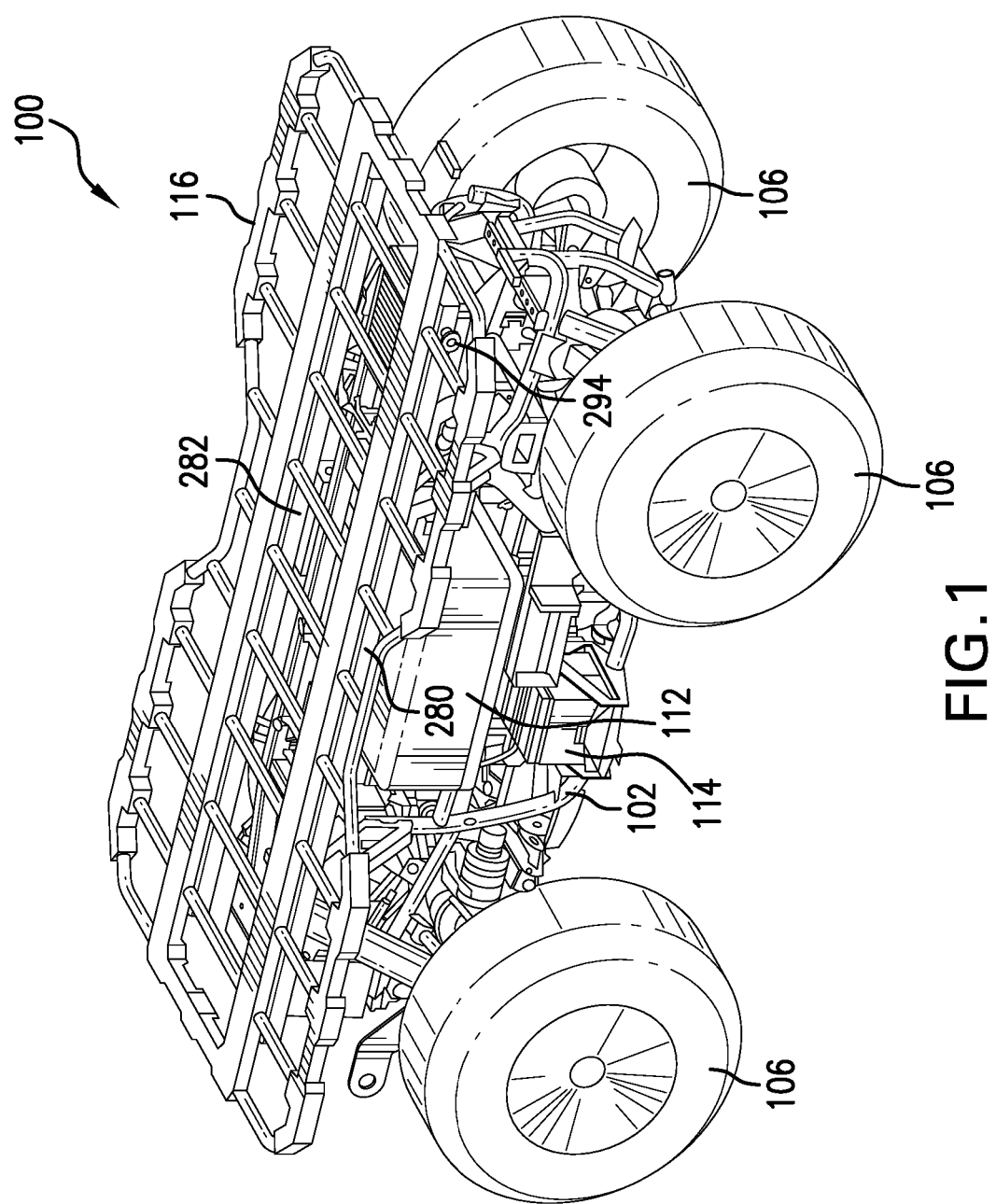
FIG. 1 is a perspective view of an autonomous all-terrain vehicle according to the present disclosure.

Referring now to the drawings, wherein like numerals refer to like parts throughout the several views, FIG. 1 illustrates an autonomous all-terrain vehicle 100 according to the present disclosure. The vehicle 100 is designed to travel off-road on a variety of terrains, including roadless rugged terrain, for recreational, utility and/or other purposes. The vehicle 100 comprises a frame structure 102 supporting a plurality of operational components for driving and maneuvering the vehicle 100, including a powertrain, a steering system, a suspension, and a braking system. The powertrain is configured for generating motive power and transmitting motive power to ground-engaging traction components, such as the depicted wheels 106, to propel the vehicle 100 on the ground. The powertrain includes a prime mover (e.g., an internal combustion engine, an electric motor, etc.) for generating motive power, and is in a driving relationship with the wheels 106 to propel the vehicle 100. In the depicted aspect, the prime mover is an electric motor 110, and, it should be appreciated, that power output of the electric motor 110 (FIGS. 7 and 8) can be controlled by a controller using parameters based on the particular specifications of the electric motor 110. With use of the electric motor 110, it should further be appreciated that the controller may manage a rechargeable battery unit of the vehicle 100, which can include a single battery or a plurality of batteries (e.g., a battery pack 112) and an associated battery generator/charger 312. This may allow the controller to monitor the state of the rechargeable battery pack 112 as well as to affect the power output of the electric motor 110 based on current battery levels. The battery pack 112 can include a conventional lead acid battery, a nickel-cadmium battery, a nickel metal hydride battery, a lithium ion battery, or a combination of conventional batteries. As is well known, the powertrain includes a transmission having elements that are operable to transmit mechanical power from the electric motor 110 to the wheels 106. To this end, the transmission can include a gearbox 114, clutch, differential, and drive shafts. The transmission could include other operational elements known to one skilled in the arts. The drive shafts can include one or more axles that can be coupled to the one or more wheels 106. According to one aspect, the frame structure 102 supports a horizontally disposed cargo carrying platform 116; although, additional user components can be supported by the frame structure 102. By way of example, instead of (or in addition to) the cargo carrying platform 116, an accessory rack (for, e.g., power tools) can be mounted to the frame structure 102.

With reference to FIGS. 2-5, the frame structure 102 includes left and right laterally spaced upper main frame members 120, 122 extended in a longitudinal direction of the frame structure 102. Each of the left and right upper main frame members 120, 122 is horizontally disposed and has an upper mounting surface 124, 126. According to one aspect, each of the left and right upper main frame members 120, 122 is rectangular shaped in cross-section taken along the lateral direction of the frame structure 102. Each of the left and right upper main frame members 120, 122 includes a forward end portion 130, 132 and a rear end portion 134, 136 (forward and rear directions of the frame structure 102 identified in the figures). A forward support member 140 interconnects the forward end portions 130, 132 and a rear support member 142 interconnects the rear end portions 134, 136. Further, a component support plate or pan 144 located rearward of the forward support member 140 can be disposed bridgingly between the left and right upper main frame members 120, 122.

The frame structure 102 further includes left and right laterally spaced lower main frame members 150, 152 extended in the longitudinal direction of the frame structure 102. Each of the left and right lower main frame members 150, 152 has a first or forward portion 154, 156 and a rearward portion 158, 160. The forward portions 154, 156, which can be inclined forward and upwards, are mounted to the left and right upper main frame members 120, 122. The rearward portions 158, 160, which can be inclined rearward and upwards, are also mounted to the left and right upper main frame members 120, 122. In the depicted embodiment, the forward end portions 130, 132 of the left and right upper main frame members 120, 122 are extended forward of the forward portions 154, 156 of the left and right lower main frame members 150, 152, and the rear end portions 134, 136 of the left and right upper main frame members 120, 122 terminate at the rearward portions 158, 160 of the left and right lower main frame members 150, 152. The left and right lower main frame members 150, 152 further include central portions 164, 166. According to one aspect, the central portions 164, 166 are extended in a lateral direction of the frame structure 102 outward of the respective left and right upper main frame members 120, 122 in a top view of the frame structure 102. Therefore, a lateral dimension of an upper part of the frame structure 102 is narrowed compared to a lower part of the frame structure.

Further, left and right first sub-frame members 170, 172 are disposed bridgingly between and mounted to the forward portions 154, 156 and the rearward portions 158, 160 of the left and right lower main frame members 150, 152. In the illustrated embodiment, the left and right first sub-frame members 170, 172 are laterally aligned with the respective left and right upper main frame members 120, 122 in a top view of the frame structure 102, which further provides for a narrowed lateral dimension of the frame structure 102. It should be appreciated that the left and right first sub-frame members 170, 172 separate a component space 174 defined by the frame structure 102 into an upper component space 176 for mounting of an associated first operational component (for example, the battery pack 112) and a lower component space 178 for mounting of an associated second operational component (for example, the electric motor 110) and an adjacent associated third operational component (for example, the gearbox 114).

Further depicted are mounting brackets 180, 182 for components of the vehicle 100 connected between the central portion 164 of the left lower main frame member 150 and the left first sub-frame member 170. A forward lower cross brace or support 184 for mounting of an operational component and lower cross members 186, 188 are disposed bridgingly between and mounted to the left and right lower main frame members 150, 152. In the illustrated embodiments, the gearbox 114 is mounted to mounting bracket 180, and the electric motor 110 is mounted to the mounting bracket 182.

With continued reference to FIGS. 2-5, left and right laterally spaced upper rear frame members 190, 192 are extended in the longitudinal direction rearward of the left and right main frame members 120, 122. Each of the left and right upper rear frame members 190, 192 is horizontally disposed, extended parallel to the respective left and right main frame members 120, 122, and is offset in a downward vertical direction from the respective left and right upper main frame members 120, 122. As depicted, first or forward end portions 194, 196 of the left and right upper rear frame members 190, 192 are mounted to the rearward portions 158, 160 of the left and right lower main frame members 150, 152. A second or rear end portion 198, 200 of each left and right upper rear frame member 190, 192 can be curved downwardly. Left and right upper rear suspension sub-frame members 210, 212 are disposed bridgingly between and mounted to the rearward portions 158, 160 of the respective left and right lower main frame members 150, 152 and the rear end portions 198, 200 of the respective left and right upper rear frame members 190, 192. Left and right lower rear suspension sub-frame members 216, 218 can be mounted to a U-shaped frame member 220 connected to the rearward portions 158, 160 of the respective left and right lower main frame members 150, 152. A rearmost cross member 226 is disposed bridgingly between and mounted to one of the left and right upper rear frame members 190, 192 and the left and right upper rear suspension sub-frame members 210, 212. Left and right rear connecting frame members 230, 232 are disposed bridgingly between and mounted to the respective left and right lower rear suspension sub-frame members 216, 218 and the rearmost cross member 226. Upper and lower support brackets for rear suspension assemblies are mounted to the respective left and right upper and lower rear suspension sub-frame members 216, 218.

A component mounting bracket 240 for an operational component of the vehicle (e.g., a battery generator/charger 312) is mounted to the forward end portion 130, 132 of each left and right upper main frame member 120, 122 forward of the forward support member 140. In the depicted embodiment, the component mounting bracket 240 includes a vertically extended support wall 242 having an upper end portion 244 which can be folded to at least partially overlie the upper mounting surfaces 124, 126 of the left and right upper main frame members 120, 122. A horizontally extended support wall 246 extends forward from a lower end portion 248 of the support wall 242.

The exemplary frame structure 102 further includes left and right upper forward suspension sub-frame members 250, 252 mounted to the forward portions 154, 156 of the respective left and right lower main frame members 150, 152. The support wall 246 of the component mounting bracket 240 can mounted to the left and right upper forward suspension sub-frame members 250, 252. Left and right lower forward suspension sub-frame members 256, 258 are disposed bridgingly between and mounted to downward curved forward end portions 260, 262 of the respective left and right upper forward suspension sub-frame members 250, 252 and the forward portions 154, 156 of the respective left and right lower main frame members 150, 152. Upper and lower support brackets for forward suspension assemblies are mounted to the respective left and right upper and lower forward suspension sub-frame members 250, 252. Left and right second sub-frame members 270, 272 are disposed bridgingly between and mounted to the forward end portions 130, 132 of the respective left and right upper main frame members 120, 122 and the respective left and right upper forward suspension sub-frame members 250, 252. The support wall 242 of the component mounting bracket 240 is located forward of the left and right second sub-frame members 270, 272.

Figure 9:
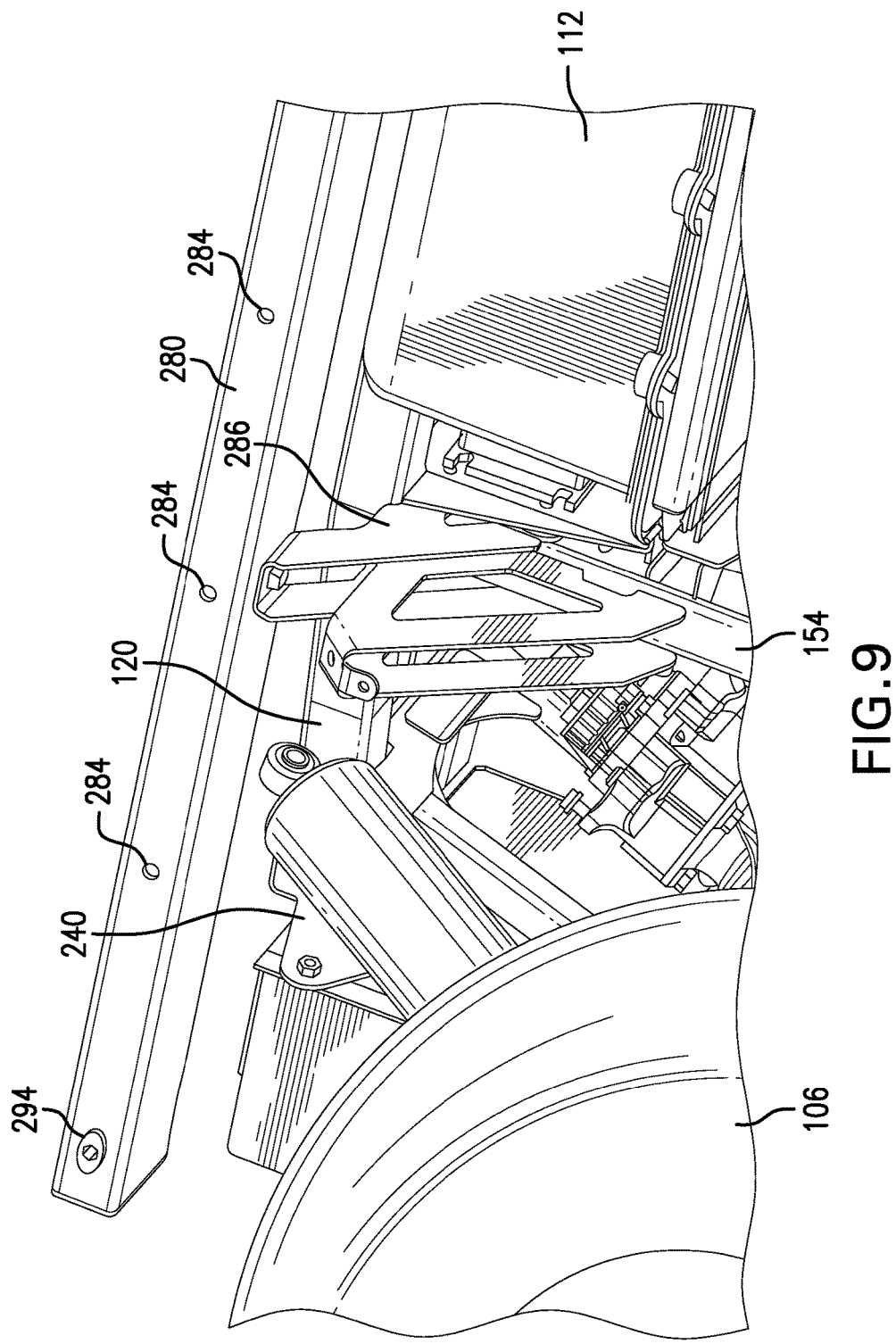
FIG. 9 is a partially enlarged view of FIG. 1.

As depicted in FIGS. 1 and 9, mounted to the frame structure 102 are left and right frame rails 280, 282 which are extended in the longitudinal direction of the frame structure 102. Each of the left and right frame rails 280, 282 can be provided with an array of apertures (only apertures 284 in the left frame rail are shown) for releasably attaching quick detach pins 294 for mounting of associated vehicle accessories to the frame structure 102. The horizontally disposed cargo carrying platform 116 is mounted to the left and right frame rails 280, 282 above the left and right upper main frame members 120, 122, and a width of the cargo carrying platform 116 is greater than a spacing between the left and right frame rails 280, 282. For example, upper surfaces of the left and right frame rails 280, 282 can be provided with an array of mounting apertures which allow for the releasable attachment of the cargo carrying platform 116. As shown in FIGS. 2-5, in the depicted embodiment, left and right forward platform mounting brackets 286, 288 and left and right rear platform mounting brackets 290, 292 are mounted to the frame structure 102, particularly one of the respective left and right upper main frame members 120, 122 and the respective left and right lower main frame members 150, 152. By way of example, the left and right forward platform mounting brackets 286, 288 can be mounted to the forward portions 154, 156 of the respective left and right lower main frame members 150, 152. And the left and right rear platform mounting brackets 290, 292 can be mounted to the rearward portions 158, 160 of the respective left and right lower main frame members 150, 152. The left frame rail 280 is mounted to mounting surfaces of the left forward and rear platform mounting brackets 286, 290, and the right frame rail 282 is mounted to mounting surfaces of the right forward and rear platform mounting brackets 288, 292. According to one aspect, the mounting surfaces of the respective left and right forward mounting brackets 286, 288 and the left and right rear platform mounting brackets 290, 292 are parallel to (and, for example, coplanar with) the upper mounting surfaces 124, 126 of the respective left and right upper main frame members 120, 122. The left and right frame rails 280, 282 are offset in a height direction of the frame structure 102 from the left and right upper main frame members 120, 122. Accordingly, the upper surfaces 124, 126 of the left and right upper main frame members 120, 122 together define an uppermost mounting plane of the frame structure 102, and the operational components for driving and maneuvering the vehicle 100 which are mounted to the frame structure 102 are disposed entirely beneath the uppermost mounting plane of the frame structure 102.

Figure 6:
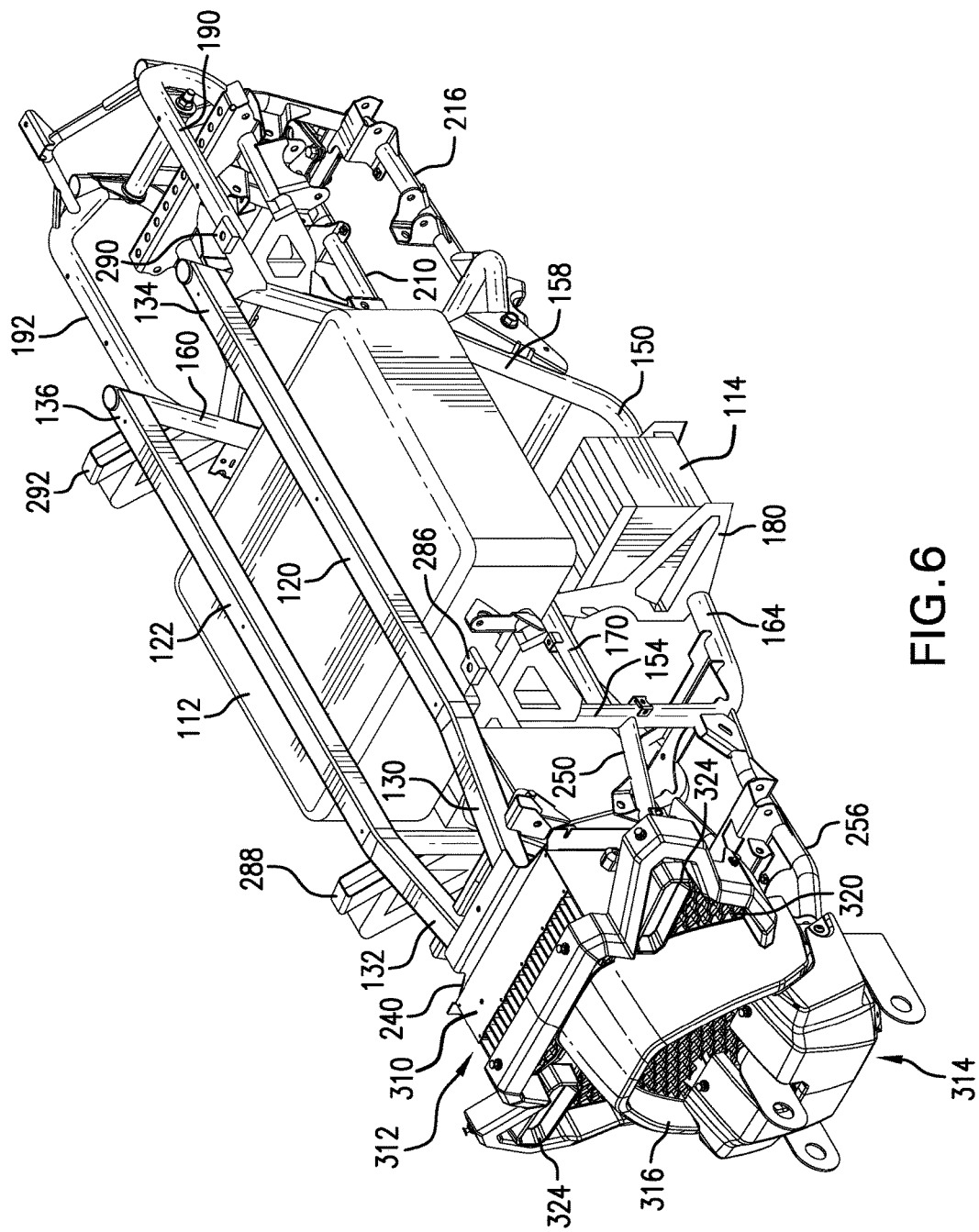
FIGS. 6 and 7 are perspective views of the frame structure with operational components for driving and maneuvering the vehicle mounted thereto.
Figure 7:
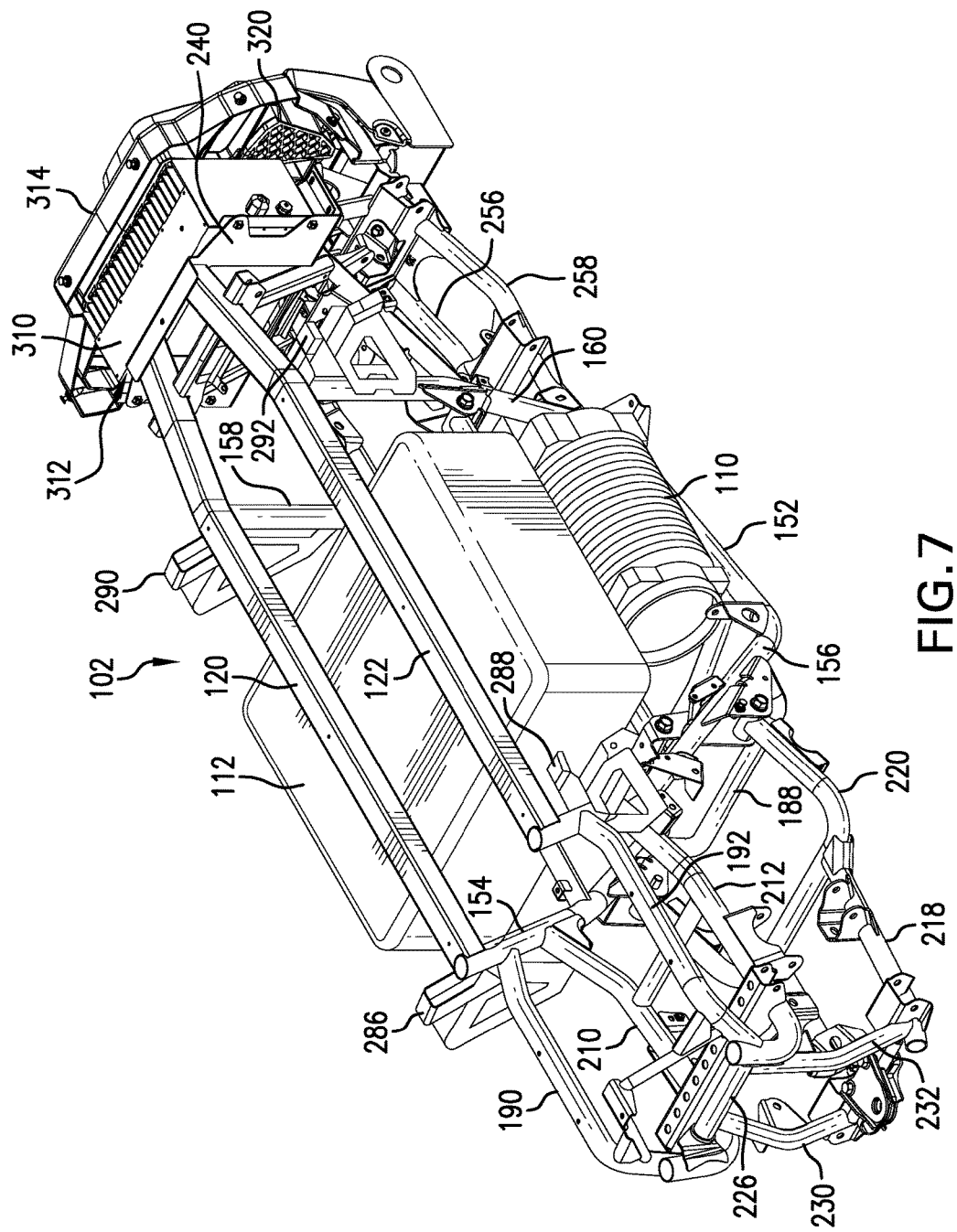
Figure 8:
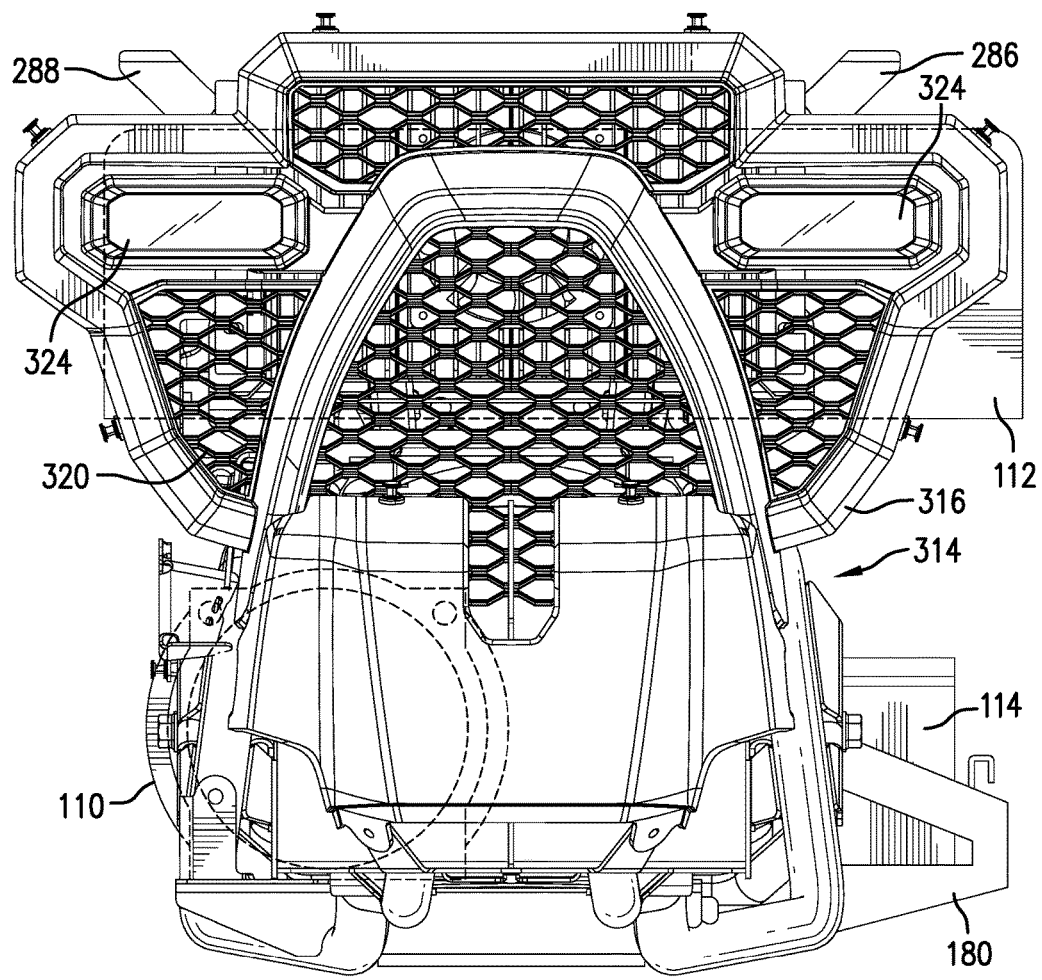
FIG. 8 is a front view of the frame structure of FIG. 6.

FIGS. 6-8 depict the electric motor 110 and the battery pack 112 mounted to the frame structure 102 beneath the uppermost mounting plane of the frame structure 102. Further depicted is a housing 310 mounted to the component mounting bracket 240 for enclosing a battery generator/charger 312, which locates the housing 310 forward of the forward end portions 130, 132 of the respective left and right upper main frame members 120, 122. According to one aspect, the housing 310 is provided in a space between the component mounting bracket 240 and a front grille 314 of the vehicle 100. As shown, the front grille 314 includes a frame 316 surrounding a securing a screen 320, and openings 324 for associated operating lights are located on the front grille 314.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A frame structure for an autonomous all-terrain vehicle comprising:

left and right laterally spaced upper main frame members extending in a longitudinal direction of the frame structure, each of the left and right upper main frame members being horizontally disposed and having an upper mounting surface;

left and right laterally spaced lower main frame members extended in the longitudinal direction, each of the left and right lower main frame members having a forward portion and a rearward portion each inclined upwards and mounted to the respective left and right upper main frame members and a central portion extended in a lateral direction of the frame structure outward of the respective left and right upper main frame members;

left and right first sub-frame members disposed bridgingly between and mounted to the forward and rearward portions of the respective left and right lower main frame members, the left and right first sub-frame members are laterally aligned with the respective left and right upper main frame members in a top view of the frame structure, and wherein the left and right first sub-frame members separate a component space defined by the frame structure into an upper component space and a lower component space; and left and right upper forward suspension sub-frame members mounted to the forward inclined portions of the respective left and right lower main frame members;

a front grille located longitudinally forward of the left and right laterally spaced upper main frame members;

a component mounting bracket mounted to a forward end portion of each left and right upper main frame member, the component mounting bracket mounted to the left and right upper forward suspension sub-frame members; and a component attached to at least one of the left and right laterally spaced upper main frame members and disposed in a space between the left and right laterally spaced upper main frame members and the front grille.

2. The frame structure of claim 1, wherein the front grille further comprises:
a frame; and
a screen surrounded and secured by the frame, the screen including at least one opening for receiving at least one operating light disposed in the front grille.

3. The frame structure of claim 1 wherein the component is mounted to the component mounting bracket and disposed in a space between the component mounting bracket and the front grille.

4. The frame structure of claim 3 further comprising:
an electric motor attached to the frame structure; and
a battery pack attached to the frame structure for proving power to the electric motor.

5. The frame structure of claim 4 wherein the component comprises:
a charger for charging the battery pack.

6. The frame structure of claim 5 wherein the component further comprises:
a housing surrounding the charger, the housing being mounted to the component mounting bracket.

7. The frame structure of claim 6 wherein the charger is in electrical communication with the battery pack.

8. The frame structure of claim 7 further comprising:
left and right second sub-frame members disposed bridgingly between and mounted to the forward end portions of the respective left and right upper main frame members and the respective left and right upper forward suspension sub-frame members; and
wherein the component mounting bracket is forward of the left and right second sub-frame members.

9. The frame structure of claim 8 further comprising:
a mounting bracket fixedly attached to one of the left and right lower main frame members, the electric motor being attached to the mounting bracket for securing the electric motor in the lower component space.

10. The frame structure of claim 9 wherein the battery pack is mounted to the left and right first sub-frame members.

11. The frame structure of claim 10 wherein the battery pack is mounted vertically above the electric motor.

12. A frame structure for an autonomous all-terrain vehicle comprising:
left and right laterally spaced upper main frame members extended in a longitudinal direction of the frame structure, each of the left and right upper main frame members is horizontally disposed and has an upper mounting surface;
left and right laterally spaced lower main frame members extended in the longitudinal direction, each of the left and right lower main frame members having a forward portion and a rearward portion each inclined upwards and mounted to the respective left and right upper main frame members and a central portion extended in a lateral direction of the frame structure outward of the respective left and right upper main frame members;
left and right first sub-frame members disposed bridgingly between and mounted to the forward and rearward portions of the respective left and right lower main frame members, the left and right first sub-frame members are laterally aligned with the respective left and right upper main frame members in a top view of the frame structure, and wherein the left and right first sub-frame members separate a component space defined by the frame structure into an upper component space and a lower component space;
a component mounting bracket mounted to a forward end portion of each left and right upper main frame member;
left and right upper forward suspension sub-frame members mounted to the forward inclined portions of the respective left and right lower main frame members, the component mounting bracket mounted to the left and right upper forward suspension sub-frame members;
left and right second sub-frame members disposed bridgingly between and mounted to the forward end portions of the respective left and right upper main frame members and the respective left and right upper forward suspension sub-frame members, the component mounting bracket being forward of the left and right second sub-frame members; and
a component mounted to the component mounting bracket.

13. The frame structure of claim 12 further comprising:
a front grille located longitudinally forward of the component mounting bracket, the front grille comprising:
a frame; and
a screen surrounded and secured by the frame, the screen including at least one opening for receiving at least one operating light disposed in the front grille.

14. The frame structure of claim 13 wherein the component is mounted to the component mounting bracket and disposed in a space between the component mounting bracket and the front grille.

15. The frame structure of claim 14 further comprising:
an electric motor located in the lower component space;
a battery pack located in the upper component space; and
wherein the battery pack is located vertically above the electric motor.

16. The frame structure of claim 15 wherein the component comprises:
a charger for charging the battery pack;
a housing surrounding the charger, the housing being mounted to the component mounting bracket; and
wherein the charger is in electrical communication with the battery pack.

17. An autonomous all-terrain vehicle comprising:
a frame structure, comprising:
left and right laterally spaced upper main frame members extended in a longitudinal direction of the frame structure, each of the left and right upper main frame members is horizontally disposed and has an upper mounting surface;
left and right laterally spaced lower main frame members extended in the longitudinal direction, each of the left and right lower main frame members having a forward portion and a rearward portion each inclined upwards and mounted to the respective left and right upper main frame members and a central portion extended in a lateral direction of the frame structure outward of the respective left and right upper main frame members;

left and right first sub-frame members disposed bridgingly between and mounted to the forward and rearward portions of the respective left and right lower main frame members, the left and right first sub-frame members are laterally aligned with the respective left and right upper main frame members in a top view of the frame structure, and wherein the left and right first sub-frame members separate a component space defined by the frame structure into an upper component space and a lower component space;

a component mounting bracket mounted to a forward end portion of each left and right upper main frame member;

left and right upper forward suspension sub-frame members mounted to the forward inclined portions of the respective left and right lower main frame members, the component mounting bracket mounted to the left and right upper forward suspension sub-frame members; and left and right second sub-frame members disposed bridgingly between and mounted to the forward end portions of the respective left and right upper main frame members and the respective left and right upper forward suspension sub-frame members, the component mounting bracket being forward of the left and right second sub-frame members;

an electric motor attached to the frame structure;

a battery pack for providing electrical power to the electric motor attached to the frame structure;

a charger for charging the battery pack, the charger including a housing surrounding the charger, the housing being mounted to the frame structure; and a front grille located longitudinally forward of the frame structure; and wherein the charger is disposed in a space between the frame structure and the front grille.

* * * * *